United States Patent

Fremerey et al.

[11] Patent Number: 5,838,083
[45] Date of Patent: Nov. 17, 1998

[54] DEVICE FOR BREAKING EDDIES AT A SURFACE SUBMERGED BY A TURBULENT FLOW

[75] Inventors: Johan K. Fremerey, Bonn; Stephan Polachowski, Linnich; Heinrich Reiff, Niederzier, all of Germany

[73] Assignee: Forschungszentrum Jülich GmbH, Jülich, Germany

[21] Appl. No.: 809,530

[22] PCT Filed: Sep. 13, 1995

[86] PCT No.: PCT/DE95/01258

§ 371 Date: Mar. 4, 1997

§ 102(e) Date: Mar. 4, 1997

[87] PCT Pub. No.: WO96/08658

PCT Pub. Date: Mar. 21, 1996

[30] Foreign Application Priority Data

Sep. 16, 1994 [DE] Germany .................... 43 33 021.9

[51] Int. Cl.⁶ ................ F22B 1/16; F16K 47/02
[52] U.S. Cl. ................ 310/90.5; 277/1; 277/53; 277/55; 251/127; 251/298; 122/32; 122/235 F
[58] Field of Search ............... 310/90, 90.5; 277/53, 277/23, 54, 56, 57; 122/32, 235 F, 438, 511, 512; 251/127, 298; 181/258, 286, 292, 293; 98/38.2

[56] References Cited

U.S. PATENT DOCUMENTS

| | | | |
|---|---|---|---|
| 4,672,940 | 6/1987 | Nakayama et al. | 123/590 |
| 4,726,563 | 2/1988 | Inglis | 251/127 |
| 4,736,713 | 4/1988 | Roarty | 122/32 |
| 4,958,098 | 9/1990 | Sarraf | 310/156 |
| 4,968,158 | 11/1990 | Atkinson et al. | 384/535 |
| 5,106,104 | 4/1992 | Atkinson et al. | 277/1 |
| 5,289,067 | 2/1994 | Tanaka et al. | 310/90.5 |
| 5,318,309 | 6/1994 | Tseng et al. | 277/53 |
| 5,471,732 | 12/1995 | Yumiki et al. | 29/596 |
| 5,496,045 | 3/1996 | Millener et al. | 277/53 |

*Primary Examiner*—Thomas M. Dougherty
*Assistant Examiner*—Tran N. Nguyen
*Attorney, Agent, or Firm*—Frishauf, Holtz, Goodman, Langer & Chick, P.C.

[57] ABSTRACT

A device for use with surfaces submerged in and moving in relation to a gas or liquid to eliminate surface flutter. Such flutter is caused by turbulence in the form of eddies formed in the gas or liquid. The device reduces the size of the eddies by placing a wall within a predetermined distance of the surface. The wall has a structure of bumps or openings formed thereon. The size of the bumps or openings, the spacing thereof along the wall, and the distance of the wall from the surface are related, so that the maximum eddy size is determined by the distance of the wall from the surface.

9 Claims, 2 Drawing Sheets

DEVICE FOR BREAKING EDDIES AT A SURFACE SUBMERGED BY A TURBULENT FLOW

BACKGROUND OF THE INVENTION

The invention relates to a device for breaking eddies at a surface submerged by a turbulent flow.

At surfaces bathed or submerged by gas or liquid, above certain flow velocities, turbulence occurs that is characterized by increasing eddy size as the flow velocity rises. In unfavorable cases, the forces involved in the eddy development can cause the submerged surfaces to flutter. Particularly in machines that rotate at high speed, such forces can cause undesired interference, especially natural precession, nutation and bending frequencies of the system.

Such interference makes itself especially seriously felt in centrifuges, if they are equipped with touchless magnetic bearings in order to attain high long-term speeds. It is then necessary to compensate for the incident interfering forces by means of electronically stabilizing the magnet bearing, which produces energy losses.

It is the object of the invention to disclose a device with whose aid the forces resulting from turbulence eddies on a submerged surface can be rendered inoperative within the natural frequency range of the submerged surface or its suspension, without having to accept increased energy losses. In particular, radial forces resulting from turbulence eddies in a magnetically supported cylindrical rotor that are in the range of the natural bearing frequency of the magnet bearing system should be intercepted.

The concept of the invention is based on the thought that turbulence eddies have a disruptive effect on the stable position of a submerged surface if the frequency spectrum of the turbulence eddies, or the spectrum of the forces involved in the eddies and acting on the submerged surface, and in particular the frequency spectrum of the radial forces engaging a magnetically supported rotor and the natural frequency spectrum of the surface of magnet bearing system mutually overlap. The idea of the invention is that by breaking the eddies or in other words making them smaller, their frequency spectrum can be shifted into a range that is sufficiently far above the critical natural frequencies of the system. At a slight distance from the submerged surface, a periodically structured wall is used; as a structure, periodically distributed bumps or lands on the wall and/or openings in the wall can be considered in particular; the dimensions and mutual spacings of the structural elements and the distance of the wall from the submerged surface are essentially equal. The distance of the wall from the submerged surface determines the maximum eddy size that still occurs or is still allowable for the intended application.

The mounting of a perforated, sievelike or gridlike structured wall, in the vicinity of the submerged surface, especially a surface rotating at high speed, considerably impedes the development of relatively long and correspondingly low-frequency eddies in the critical natural frequency range and leads to calming of the dynamic system performance, especially under the conditions of magnetic bearing.

The advantages of the device of the invention can be applied successfully to a turbulent flow through tubes as well, and to airborne or floating bodies.

BRIEF DESCRIPTION OF THE DRAWINGS

The invention will be described in further detail below in terms of exemplary embodiments that are schematically shown in the drawing. In detail, the drawing shows the following.

BRIEF DESCRIPTION OF THE INVENTION

Figure 1:
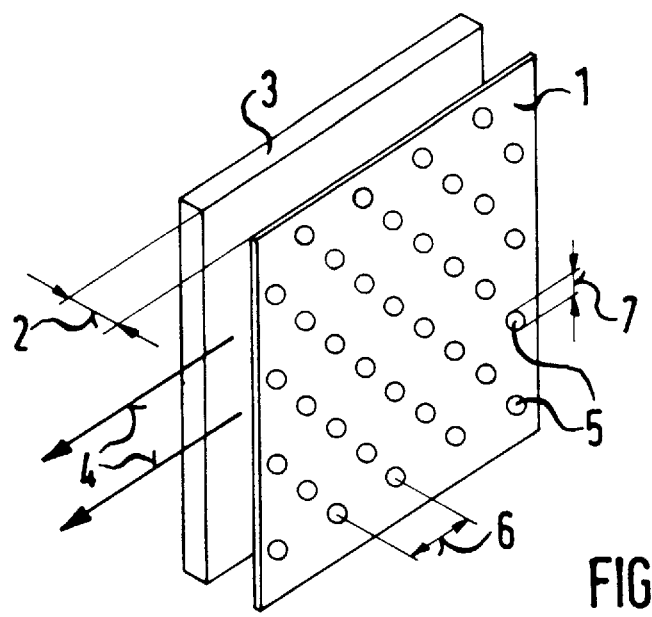
FIG. 1, a perforated wall in front of a surface submerged by a tangential flow.

FIG. 1 shows a wall 1, structured in the form of a perforated metal sheet, which is disposed at a distance 2 from a submerged surface 3. The flow direction of the flowing medium between the surface and the wall is marked with arrows 4. The distance 2 between the wall 1 and surface 3 determines the eddy size that still remains undisturbed in the turbulent flow of the medium. Eddies that are larger than the distance between the surface and the wall are broken. The distance 2 required to destroy undesirably large eddies is essentially ascertained empirically. If there is an optimal distance between the submerged surface 3 and the wall 1, fluttering of the surface in the natural frequency spectrum can be averted. Especially in the touchless magnetic bearing of rotating bodies, a stable rotor position is attainable.

In accordance with the requisite distance 2, structural elements 5 present on the wall 2 and the mutual spacings 6 between them are measured. In the case of the structured wall 2 of FIG. 1, embodied as a perforated metal sheet, the individual holes, as structural elements 5, have a mutual spacing 6 and diameter 7 whose size corresponds to the size of the distance 2.

Figure 2:
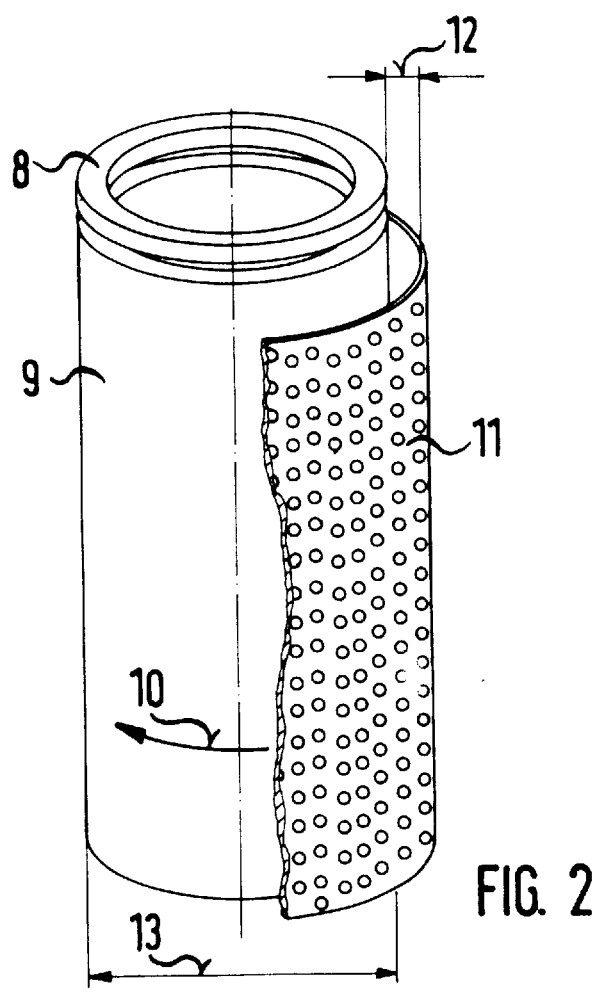
FIG. 2, a rotating, magnetically supported cylinder with a perforated wall.

FIG. 2 shows a rotor 9, which is supported in touchless fashion by a magnet ring 8 of a magnetic bearing; it rotates in the rotational direction 10 and on its outer surface, as a consequence of friction with the gas, in the exemplary embodiment air, surrounding the rotor, it generates a gas flow oriented in the direction of rotation 10. A wall 11 disposed concentric with the rotor 9 and likewise embodied as a perforated metal sheet, is either mounted fixed or supported rotatingly; the rotary speed of the wall 11 is very much less than the rotary speed of the rotor 9, amounting for instance to only one-tenth the rotary speed of the rotor. The wall 11 assures breakage of turbulence eddies that occur at high rotary speeds, and whose size exceeds the size of the distance 12 between the wall 11 and the rotor 9. In the exemplary embodiment, the rotor 9 has a diameter 13 of 40 mm; the distance 12 between the rotor 9 and wall 11 is 2 mm; the diameter of the holes in the perforated metal sheet is also 2 mm; and the hole spacing is 4 mm. The rotor 9 in the exemplary embodiment is a rotating centrifuging chamber of a centrifuge. The wall 11 is disposed on the outer wall side of the centrifuging chamber, outside the chamber interior that serves as a work chamber for centrifuging.

Figure 3:
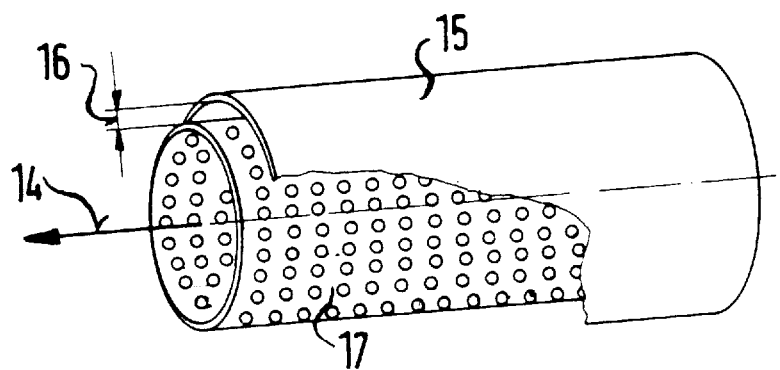
FIG. 3, a flow tube with a perforated wall on the inside.

FIG. 3 shows a tube 15 through which a gaseous or liquid medium flows in the flow direction 14. Inside the tube 15 with the flow through it, a wall 17 embodied as a perforated metal sheet is disposed at a distance 16 from the tube surface inside it, in order to break turbulence eddies at a high flow velocity. The distance between the wall and the tube surface on the inside, and the dimensions of the holes as structural elements of the walls, again correspond to the dimensions given for FIG. 2.

Figure 4:
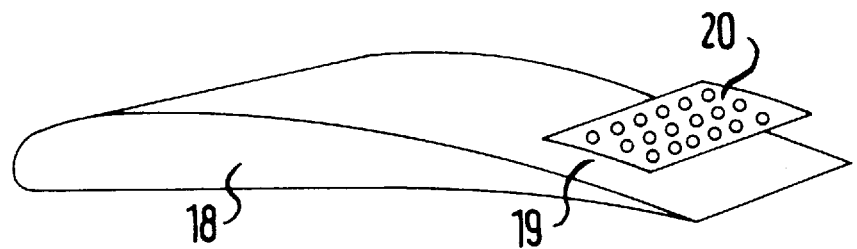
FIG. 4, the submerged surface of an airborne or floating body with a perforated wall disposed in the flow space.

FIG. 4 shows a supporting vane profile 18, which on its upper surface bathed by a gaseous or liquid medium, in the trailing region 19 of the supporting vane profile in terms of the flow direction, has a wall 20, again equipped as a perforated metal sheet, in order to break turbulence eddies in the trailing region of the flow.

List of Reference Numerals

Wall 1, 11, 17, 20
Distance 2, 12, 16
Surface 3
Arrow 4
Structural elements 5
Spacings 6
Diameter 7
Magnet ring 8
Rotor 9
Rotational direction 10
Rotor diameter 13
Flow direction 14
Tube 15
Supporting vane profile 18
Trailing flow region 19

We claim:

1. A device for breaking flow eddies created by flow across a surface, comprising:

a wall disposed at a predetermined distance from said surface such that flow occurs in a space therebetween, and a plurality of structural elements provided in said wall and in communication with the flow in said space, wherein a uniform spacing is provided between adjacent ones of said structural elements, and wherein said uniform spacing and dimensions of said structural elements are based on said predetermined distance.

2. The device of claim 1, wherein said structural elements are holes.

3. The device of claim 2, wherein said dimensions of said structural elements which are based on said predetermined distance include a diameter of said holes.

4. The device of claim 1, wherein said wall comprises a perforated sheet.

5. The device of claim 1, wherein said wall comprises a perforated sieve.

6. The device of claim 1, wherein said wall comprises a perforated grid.

7. The device of claim 1, further comprising means for moving said wall substantially parallel to said surface.

8. The device of claim 7, wherein said surface rotates, and wherein said means is a rotating means which rotates said wall more slowly than said surface rotates.

9. The device of claim 1, wherein said surface is an inner surface of a tube within which said flow occurs, and said wall is within said tube.

* * * * *